May 29, 1962     O. SCHRÖDER     3,036,421
SPINDLE DRIVE CONTROL
Filed Dec. 18, 1959
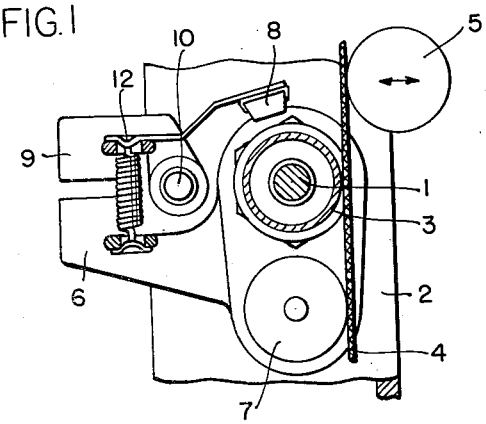
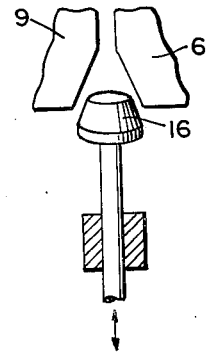
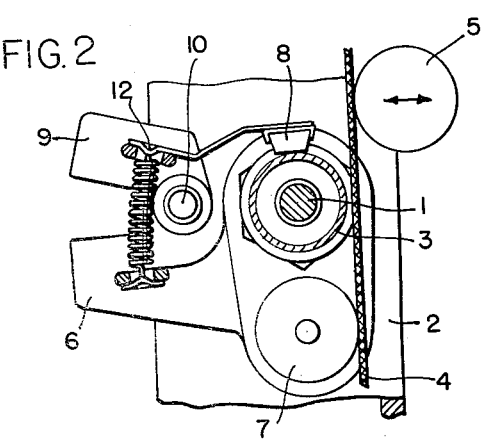
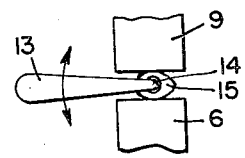
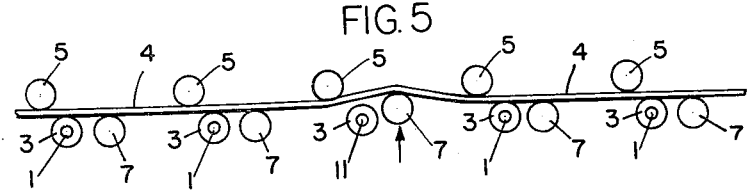
INVENTOR:
OTTO SCHRÖDER
BY Marzall, Johnston,
Cook & Root
ATT'YS United States Patent Office 3,036,421
Patented May 29, 1962

3,036,421
SPINDLE DRIVE CONTROL
Otto Schröder, Remscheid-Lennep, Germany, assignor to Barmer Maschinenfabrik Aktiengesellschaft, Wuppertal-Oberbarmen, Germany
Filed Dec. 18, 1959, Ser. No. 860,407
Claims priority, application Germany Dec. 20, 1958
7 Claims. (Cl. 57—88)

The present invention relates to a device for controlling the movement of spindles. More particularly, the invention is directed to a means for starting and stopping the movement of spindles and especially ring twist spindles which are driven by means of an endless belt.

It is conventional to wind bobbins by means of spindles which are arranged in a row. The spindles are driven by an endless belt running at high speeds in contact with the whorls of the various spindles. In order to provide for replacement of a bobbin or to repair a broken filament or thread during the winding of the bobbin, it has been the practice to stop the individual spindles by shifting them away from the belt and by simultaneously pressing the whorl of the spindle against a brake. When the spindle is used in connection with a twist ring, moving the spindle away from the belt changes its relative position to the ring. To prevent damage to the thread, it is therefore necessary to increase the width of the ring and, accordingly, to slow down the rate of revolution of the ring.

It has been proposed that the spindles of the ring twist machines be mounted in fixed position and that the belt be conducted between two parallel axis auxiliary rollers at each spindle. These rollers are carried on a swinging arm and, therefore, by changing their position, can cause the belt to engage or disengage the whorl of the spindle. Although this arrangement maintains the relative position of the spindle and twist ring, it creates other problems. In particular, moving the belt away from the spindle in this manner for the purpose of stopping the spindle adversely affects the operation of adjoining spindles. Inasmuch as it is advantageous to place the spindles as close together as possible, even slight deflections of the belt at one spindle necessarily results in a change in the gripping angle and contact pressure of the belt at adjoining spindles. For this reason, the speed of revolution and twist imparted to the thread at the spindles are modified.

It is an object of the present invention to provide a device which can be used to control the movement of individual spindles without causing the difficulties usually found where either the spindle is moved or where the belt is disengaged from the spindle whorl by means of a roller.

Another object of the invention is to provide a device whereby a drive belt can be disengaged from a spindle whorl without causing a change in the operation of adjacent spindles.

Another object is to provide a simple and relatively inexpensive device which effectively controls the movement of individual spindles.

Still another object is to provide a device which can be used to move the drive belt away from a spindle whorl while at the same time applying a braking means to said whorl.

Other objects will become readily apparent to those skilled in the art from the following detailed description of the invention.

In general, the present invention comprises the discovery that the movement of individual spindles which are placed in a row of other spindles can be advantageously controlled by two belt guide rollers, one of which can be the whorl of the twist spindle, in association with another axially parallel roller which is used as a control member. By moving the last named roller, the belt can be disengaged from a spindle. More particularly, in the subject device the twist spindle is mounted in a fixed position; between adjacent spindles are mounted two rollers on either side of the drive belt; one of the rollers being pivotally mounted so that the belt can be disengaged from the spindle and the other being mounted either fixedly or adjustably so that it can be set with respect to the other roller and the twist spindle.

Another feature of the invention lies in the use of a particular braking means in connection with the roller arrangement. In my preferred embodiment, the braking means is mounted by itself on a movable carrier element which, in turn, is associated with the control roller carrier by means of a connecting member in such a manner that the movement of the control roller carrier causes a simultaneous movement of the brake carrier element. The connecting member, in particular, may consist of a spreader device mounted between the two carriers, which device, as will be shown in more detail subsequently, can either be operated by hand or by an automatic means in the case of thread breakage. When activated, the spreader places in operation both the control roller carrier and the brake carrier element causing the roller to press against the belt and the brake to engage the whorl. When the spreader device is not being operated, a spring between the two arms of the device provides a rest position whereby the brake is not in contact with the whorl and whereby the control roller is not in a position to disengage the drive belt from a whorl.

The details of the invention will become clear by reference to the attached drawing in which:

FIG. 1 is a schematic top plan section view of the subject device in its rest position;

FIG. 2 is a schematic top plan section view showing the device in its active position, that is, when the brake is in contact with the whorl and where the control roller has moved the belt away from the spindle;

FIG. 3 is a detailed view of a manually operated device for operating the mechanism;

FIG. 4 is a detailed view of an automatic means for disengaging the belt from the whorl in the event of thread breakage; and FIG. 5 is a schematic view showing a row of spindles in association with control rollers and a drive belt.

In FIGURE 1, spindle 1 is mounted in a fixed position on spindle bench or rail 2. In the subject embodiment, spindle whorl 3 forms one guide roller which is in contact with drive belt 4. On the other side of belt 4 is placed a second guide roller 5 which also can be supported in a fixed position on spindle bench 2. The position of roller 5 is adjustable so that the contact pressure of the belt against the whorl can be advantageously set according to operating requirements. A pair of rollers (not shown) can be used in place of roller 5. These rollers are spaced at a particular distance from the spindle axis. Control roller 7 is mounted on movable carrier 6 adjacent to spindle 1. Roller 7 serves to move belt 4 away from whorl 3 as is more particularly shown in FIGURE 2. The carrier 6 is pivotally mounted about spindle 1 or its base. Braking device 8 is connected by a flexible carrier member to brake carrier element 9 which, in turn, is pivotally mounted around pin 10 on spindle bench 2. Spring 12 engages control roller carrier 6 and brake carrier element 9. When at rest, the spring along with stops (not shown in detail) provide a noncontact position for brake 8 and for control roller 7 with respect to drive belt 4.

When the device is operated, the brake carrier element and control roller carrier are spread by members which are shown in detail in FIGURES 3 and 4. In FIGURE 3, the manually operated control member consists of lever 13 which pivots about pin 14 and is situated between carrier arm 6 and carrier element 9. When lever 13 is moved, control piece 15 spreads the two carriers against the action of spring 12 so that the brake engages the whorl and roller 7 acts against the drive belt.

In FIGURE 4, an automatic device is shown which could operate to stop the spindle in case of thread breakage or for other purposes. In this embodiment, the mechanism consists of a conically-shaped bolt 16 which is passed between carriers 6 and 9 causing them to spread and thereby activate the control roller and the brake. It is clear that means other than those set forth in FIGURES 3 and 4 could be used to operate the device.

The schematic view set forth in FIGURE 5 shows belt 4 passing along a row of spindles. The belt has been disengaged from whorl 3 of spindle 11 by roller 7. Despite this fact, the belt remains in undisturbed contact with the other spindles 1 and their whorls 3.

As is pointed out above, an arrangement such as that described in the subject specification has a number of advantages over known devices. The subject control means makes it possible to disengage a belt for the purpose of stopping a spindle without adversely affecting the operation of adjoining spindles. Once the proper settings have been determined for a given winding operation, and the belt speed, the distance between the guide rollers, and the contact pressure of the belt at the spindles has been set, the rate of revolution of the spindles and the twist imparted by the twist rings remain constant at adjoining spindles even when individual spindles are stopped. Additionally, the present arrangement lends itself particularly well to the use of automatic devices for stopping the spindle in the event of thread breakage.

Obviously, many modifications and variations of the invention as hereinbefore set forth may be made without departing from the spirit and scope thereof, and therefore, only such limitations should be imposed as are indicated in the appended claims.

The invention is hereby claimed as follows:

1. In a filament winding means which includes a plurality of spindle units driven by an endless belt, an improved guide means for said belt which comprises two axially parallel guide rollers in association with each spindle unit between which said belt passes, and a movable control roller pivotally mounted on the spindle side of said belt, the said control roller being capable of acting against the belt to disengage the belt from said spindle unit, said pivotally mounted control roller and said spindle unit being between two guide rollers in contact with said belt on the side opposite said spindle unit, said guide means including a guide roller in contact with said belt on the side opposite said spindle unit between adjacent spindle units of said filament winding means.

2. An improved guide means as in claim 1 wherein one of the two axially parallel guide rollers is the whorl of the twist spindle.

3. In a filament winding device which includes a plurality of spindle units driven by an endless belt, an improved guide means for said belt and an improved braking means for each spindle which comprises in combination: two axially parallel guide rollers in association with each spindle unit between which said belt passes, a control roller and control roller carrier pivotally mounted on the spindle side of the said belt, the said control roller being capable of acting against the belt to disengage the belt from said spindle, said guide means including a guide roller in contact with said belt on the side opposite said spindle unit between adjacent spindle units, and a braking element mounted on a movable carrier and operatively connected to said control roller carrier whereby the braking element is activated when the control roller is moved from its rest position.

4. In a filament winding means which includes a plurality of spindle units driven by an endless belt, an improved guide means for said belt which comprises a fixed guide roller in association with each spindle unit in contact with said belt, a whorl of a twist spindle axially parallel to said first guide roller in contact with the opposite side of said belt, a movable control roller pivotally mounted on the spindle side of said belt, said movable control roller being capable of acting against said belt to disengage the belt from the whorl of said spindle, said whorl lying between said first guide roller and said movable control roller, said guide means including a guide roller in contact with said belt on the side opposite said spindle unit between adjacent spindle units.

5. An improved guide means as in claim 1 wherein at least one of the two axially parallel guide rollers is adjustably mounted whereby the contact pressure of the belt against said spindle unit can be set according to operating requirements.

6. In a filament winding device which includes a plurality of spindle units driven by an endless belt, an improved guide means for said belt and an improved braking means for each spindle which comprises in combination: two axially parallel guide rollers in association with each spindle unit between which said belt passes, a control roller and control roller carrier pivotally mounted on the spindle side of the said belt, the said control roller being capable of acting against the belt to disengage the belt from said spindle, said guide means including a guide roller in contact with said belt on the side opposite said spindle unit between adjacent spindle units, and a braking element mounted on a movable carrier and operatively connected to said control roller carrier by means of a spreader device, said spreader device comprising a pivotally mounted lever which in operation engages both the control roller carrier and the braking element carrier.

7. In a filament winding device which includes a plurality of spindle units driven by an endless belt, an improved guide means for said belt and an improved braking means for each spindle which comprises in combination: two axially parallel guide rollers in association with each spindle unit between which said belt passes, a control roller and control roller carrier pivotally mounted on the spindle side of the said belt, the said control roller being capable of acting against the belt to disengage the belt from said spindle, said guide means including a guide roller in contact with said belt on the side opposite said spindle unit between adjacent spindle units, and a braking element mounted on a movable carrier and operatively connected to said control roller carrier by means of a spreader device, said spreader device comprising a conically shaped bolt which engages both the control roller carrier and the braking element carrier.

References Cited in the file of this patent

UNITED STATES PATENTS

| | | |
|---|---|---|
| 2,023,407 | Cobb | Dec. 10, 1935 |
| 2,374,085 | Gwaltney et al. | Apr. 17, 1945 |
| 2,566,258 | Sweet | Aug. 28, 1951 |

FOREIGN PATENTS

| | | |
|---|---|---|
| 313,585 | Great Britain | Jan. 24, 1930 |